(12) United States Patent
Jones

(10) Patent No.: US 6,333,829 B1
(45) Date of Patent: Dec. 25, 2001

(54) CARTRIDGE ENGAGING ASSEMBLY WITHIN A STORAGE ARRAY

(75) Inventor: David Paul Jones, Bellvue, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/522,853

(22) Filed: Mar. 10, 2000

(51) Int. Cl.$^7$ .................................................. G11B 15/68
(52) U.S. Cl. .............................................................. 360/92
(58) Field of Search ........................ 360/92, 96.3, 96.1, 360/96.5; 369/34, 36

(56) References Cited

U.S. PATENT DOCUMENTS

| | | | |
|---|---|---|---|
| 5,548,567 | 8/1996 | Sawai | 369/36 |
| 5,596,556 | 1/1997 | Luffel, et al. | 369/36 |
| 6,239,942 | * 5/2001 | Leggett | 360/92 |
| 6,259,578 | * 7/2001 | Christiansen et al. | 360/92 |

OTHER PUBLICATIONS

U.S. Patent Application Serial No. 09/031,753 filed Feb. 27, 1998 for PIN–IN–TRACK LIFT SYSTEM of David P. Jones and Mark A. Smith, Attorney Docket No. 10971411–2.

U.S. Patent Application Serial No. 09/337,802 file Jun. 22, 1999 for APPARATUS FOR TRANSLATING A CARTRIDGE ACCESS DEVICE of Robert W. Luffel and David P. Jones; Attorney Docket No. 10980296–1.

U.S. Patent Application Serial No. 09/137,350 filed Aug. 31, 1998 for MODULAR DATA STORAGE SYSTEM of Joseph White, Matthias Lester, and David Jones; Attorney Docket No. 10971954–1.

* cited by examiner

Primary Examiner—Allen Cao

(57) ABSTRACT

A cartridge engaging assembly for a cartridge handing system is disclosed. The assembly may include a cartridge engaging device positioned within each of the cartridge storage locations in a cartridge storage array. An actuator device may be included which is adapted to engage the cartridge engaging device in order to push a cartridge out of a storage location during a push operating mode or pull a cartridge into a storage location during a pull operating mode. An actuator drive assembly may be operably connected to the actuator device in order to linearly translate the actuator to device in a lateral direction. A linear translation assembly may be provided in order to linearly translate the read/write drive, actuator drive assembly, and actuator device among the storage locations in the cartridge storage array. A method for transporting a cartridge between a storage location and a read/write drive utilizing the cartridge engaging assembly is also disclosed.

16 Claims, 11 Drawing Sheets

CARTRIDGE ENGAGING ASSEMBLY WITHIN A STORAGE ARRAY

FIELD OF THE INVENTION

The present invention relates generally to a cartridge handling system for storing and translating data cartridges, and more specifically to a cartridge engaging assembly which is incorporated mostly within a storage array, with the actuator mechanism therefor being connected to a translatable read/write drive.

BACKGROUND OF THE INVENTION

Data storage in the computer industry is accomplished in a number of ways. For example, data may be stored on tape, compact disk, "floppy" or "hard" disk, and the like. Oftentimes, data storage media which is transferrable from one location to another is housed within a parallelepiped-shaped cartridge. However, it is to be understood that the term "cartridge" as used herein includes other types of storage media and should not be construed to limit the present invention to be utilized only with data cartridges.

Data storage systems are used to store data storage media devices such as data cartridges at known locations and to retrieve desired cartridges so that data may be written to or read from the cartridges. Such data storage and handling systems are often referred to as "juke box" data storage systems, particularly if they can accommodate a large number of individual data cartridges.

A data storage handling system may include a cartridge engaging assembly or "picker" which is adapted to retrieve a data cartridge and transfer the cartridge from one location to another, such as from a cartridge storage array to a read/write drive. The drive may then be used to read data from or write data to the cartridge. Once the read/write operation is complete, the cartridge engaging assembly may withdraw the data cartridge from the drive and return it to the appropriate location within the cartridge storage array.

The cartridge storage array(s) and read/write drive(s) in a cartridge handling system are usually non-translatable, i.e., these components are fixedly attached to the cartridge handling system housing or the like. A linear translation assembly may then be provided in order to translate the cartridge engaging assembly among the cartridge storage locations in a storage array. Some linear translation assemblies translate the cartridge engaging assembly vertically in order to access a vertically-oriented array of cartridge storage locations. Such linear translation assemblies are shown and described in U.S. patent application Ser. No. 09/031,753 for PIN-IN-TRACK LIFT SYSTEM and U.S. Pat. No. 5,596,556 for LINEAR DISPLACEMENT AND SUPPORT APPARATUS FOR USE IN A CARTRIDGE HANDLING SYSTEM, which are each hereby specifically incorporated by reference for all that is contained therein. Other linear translation assemblies translate the cartridge engaging assembly horizontally in order to access a horizontally-oriented array of cartridge storage location. Such linear translation assemblies are shown and described in U.S. patent application Ser. No. 09/137,350 for MODULAR DATA STORAGE SYSTEM and U.S. patent application Ser. No. 09/337,802 for APPARATUS FOR TRANSLATING A CARTRIDGE ACCESS DEVICE, which are hereby specifically incorporated by reference for all that is contained therein.

Typically, the cartridge engaging assembly is a mechanism that is separate from the cartridge storage arrays and read/write drives, residing in a volume dedicated entirely to its operation. In some cartridge handling systems, the cartridge engaging assembly is positioned between a configuration of storage arrays and drives, and in other systems the cartridge engaging assembly is positioned in front of the storage arrays and drives. In either case, the volume required for its operation cannot be used for any other function.

Thus, a need exists for a cartridge engaging assembly which does not reside in a volume dedicated to its operation, entirely separate from the cartridge storage arrays and drives. Specifically, a need exists for a cartridge engaging assembly which is mostly incorporated within each cartridge storage array in a cartridge handling system so that the total volume of the system is reduced. Such a cartridge engaging assembly should also have a lower number of individual parts than prior art cartridge engaging assemblies, thus reducing the overall cost of the system.

A need also exists for a cartridge engaging assembly having a cartridge engaging device positioned within each of the cartridge storage locations within an array which is adapted to push a cartridge out of its location and pull a cartridge into its location. Should one of the cartridge engaging devices break or otherwise fail, access to only one of the cartridge locations would be lost. In prior art cartridge engaging assemblies whereby only one cartridge engaging device is provided for engaging all of the cartridges in an array, access to all of the cartridge locations are lost when such a cartridge engaging device fails.

Finally, a need exists for a cartridge handling system whereby a cartridge read/write drive may be positioned directly adjacent to a cartridge storage array. Such a read/write drive would preferably be translatable among the cartridge storage locations within an array.

SUMMARY OF THE INVENTION

The present invention is directed to a cartridge engaging assembly for a cartridge handling system. The cartridge handling system includes at least one cartridge storage array having a plurality of storage locations. The cartridge handling system also includes at least one linearly translatable read/write drive positioned directly adjacent to the cartridge storage array.

The cartridge engaging assembly may include a cartridge engaging device positioned within each of the storage locations which is adapted to be linearly translated in a lateral direction in order to push a cartridge out of one of the storage locations during a push operating mode or pull a cartridge into one of the storage locations during a pull operating mode. The cartridge engaging device may comprise an extending member which extends through a slot in each of the storage locations. The cartridge engaging device may further comprise a guide plate positioned within each of the storage locations, and a latch member which is engageable with a cartridge. The latch member may be in an open position (not binding with a cartridge) during the push operating mode and during a ready operating mode, and it may be in a closed position (binding with a cartridge) during the pull operating mode. The latch member may comprise a C-shaped portion which is engageable with an edge portion of a cartridge. The cartridge engaging device may be slidably received within a slot in the guide plate. The latch member may further comprise a first upper surface which may abut the slot upper surface during the push operating mode, and a second upper surface which may abut the slot upper surface during the pull operating mode.

The cartridge engaging assembly may also include at least one actuator device which is adapted to engage the cartridge engaging device in order to push a cartridge out of one of the storage locations or pull a cartridge into one of the storage locations. The actuator device may have a notch which is engageable with the extending member during the push operating mode and the pull operating mode.

The cartridge engaging assembly may further include at least one actuator drive assembly operably connected to the actuator device which is adapted to linearly translate the actuator device. The actuator drive assembly may comprise a motor which may be attached to the read/write drive, a drive member such as a gear or pulley which is operably connected to the motor, and an idler member such as a gear or pulley rotatably mounted on a longitudinally-oriented shaft. A belt may be operably connected to the drive member and the idler member. The actuator device may be attached to the belt and is linearly translatable thereon in a lateral direction. The actuator device may also be slidably mounted on a laterally-oriented shaft in order to provide stability during translation thereof.

A linear translation assembly may be provided which is adapted to linearly translate the read/write drive, actuator drive assembly, and actuator device among the storage locations in the cartridge storage array.

The present invention is also directed to a method for transporting a cartridge between a storage location and a read/write drive utilizing the cartridge engaging assembly of the present invention. The method comprises the initial step of longitudinally aligning the read/write drive with one of the storage locations and the actuator device with the cartridge engaging device. Next, the cartridge engaging device is engaged by the actuator device. Finally, the actuator device is linearly translated in a lateral direction, thereby transporting the cartridge between one of the storage locations and the read/write drive.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
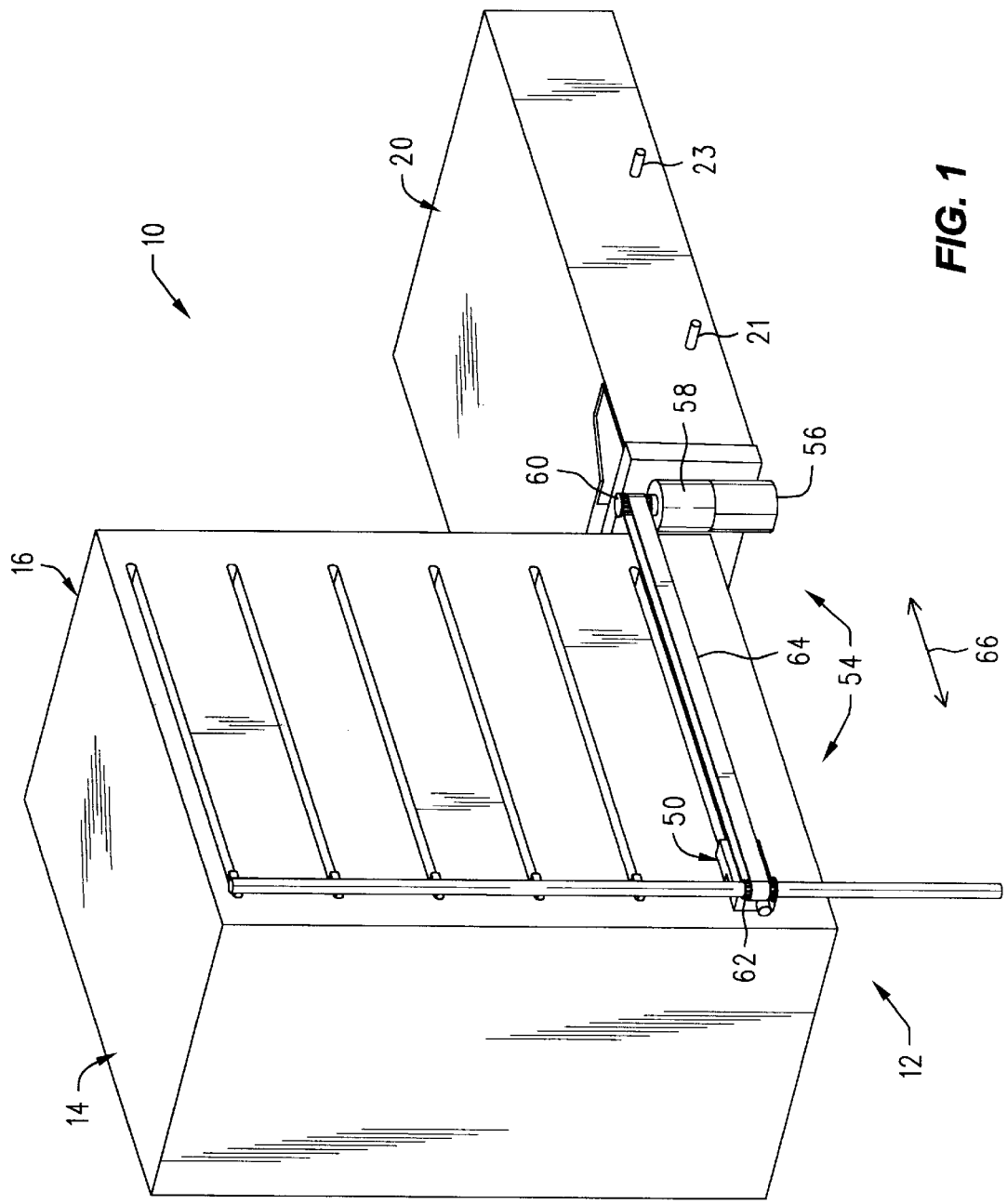
FIG. 1 is an isometric view of a cartridge handling system utilizing the cartridge engaging assembly of the present invention.

FIG. 1 illustrates a cartridge handling system 10 utilizing the cartridge engaging assembly 12 of the present invention. The cartridge handling system 10 may comprise at least one cartridge storage array 14 having a plurality of storage locations 16 (best shown in FIG. 2), and at least one read/write drive 20 positioned directly adjacent to the cartridge storage array 14. Each of the cartridge locations 16 are adapted to store a cartridge 18 (FIG. 2) or other type of storage media. The read/write drive 20 is positioned directly adjacent to, but not in contact with, the cartridge storage array 14 so that a cartridge 18 may be fed directly into the drive 20 utilizing the cartridge engaging assembly 12 described herein.

Figure 2:
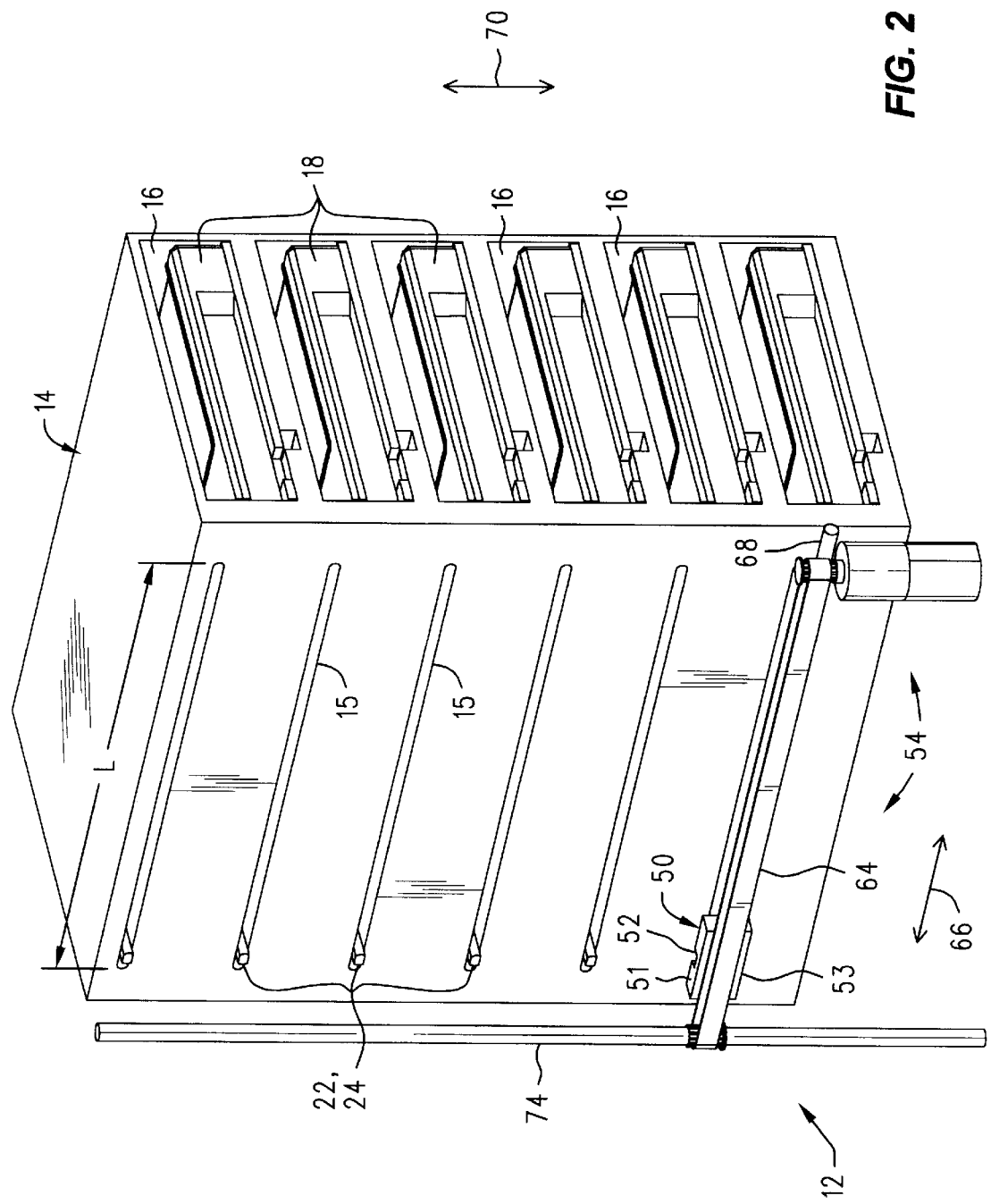
FIG. 2 is an isometric view of the cartridge handling system of FIG. 1 with the read/write drive removed for clarity.

As shown in FIG. 2, the cartridge engaging assembly 12 may comprise a cartridge engaging device 22 positioned within each of the storage locations 16 which is adapted to push a cartridge 18 out of one of the storage locations 16 and pull a cartridge 18 into one of the storage locations 16. It should be noted that, should one of the cartridge engaging devices 22 break or otherwise fail, access to only one of the cartridge locations 16 would be lost.

Each of the cartridge engaging devices 22 may comprise an extending member 24 which projects from a slot 15 in each of the cartridge storage locations 16. The cartridge engaging assembly 12 may further comprise an actuator device 50 which is adapted to engage the extending member 24 of the cartridge engaging device 22 in order to push a cartridge 18 out of one of the storage locations 16 or pull a cartridge 18 into one of the storage locations 16. Alternatively, a human operator may manually engage an extending member 24 in order to push a cartridge 18 out or pull a cartridge 18 into one of the storage locations 16. Furthermore, loading the cartridges 18 may be accomplished by simply inserting each cartridge 18 fully into a storage location 16.

The cartridge engaging assembly 12 may further comprise an actuator drive assembly 54 operably connected to the actuator device 50 which is adapted to translate the actuator device 50 in a lateral direction 66 (i.e., along the plane of the cartridge 18). The length "L" of the slot 15 defines the range of translation in direction 66 that the extending member 24 may travel. The length "L" is adequate to allow a cartridge 18 to be pushed out of or pulled into a storage location 16.

Figure 3:
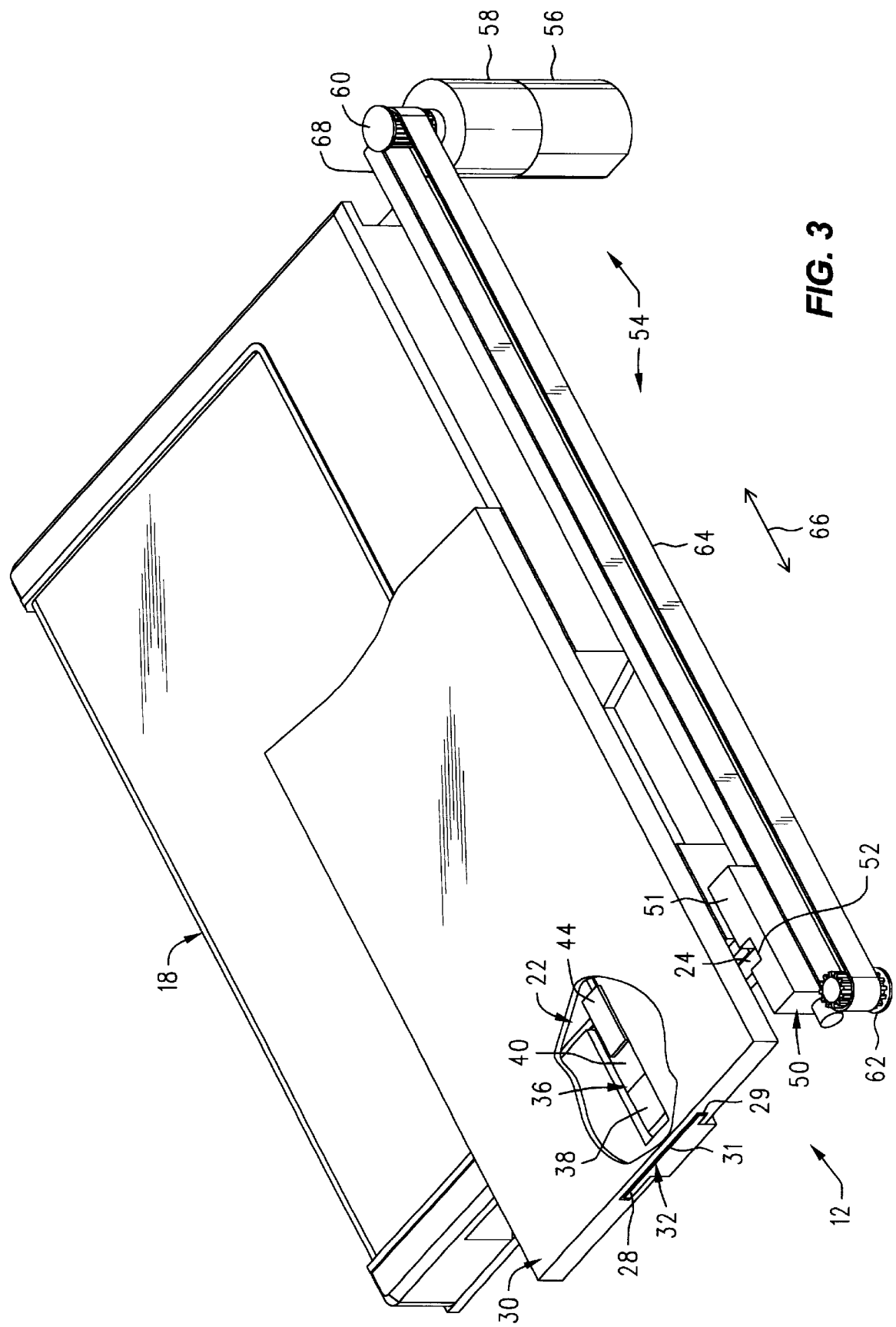
FIG. 3 is an isometric view of a portion of the cartridge engaging assembly of FIG. 1 with a cartridge.

As shown in FIGS. 2 and 3, the actuator device 50 may comprise a notch 52 which is engageable with the extending member 24 of each cartridge engaging device 22. The notch 52 preferably extends from the top 51 of the actuator device to the bottom 53 thereof and is somewhat wider than an extending member 24 so that the actuator device 50 may pass by the extending members 24 as the actuator device 50 is being laterally translated among the cartridge storage locations 16 in a longitudinal direction 70 as described in further detail below.

As best shown in FIG. 3, the actuator drive assembly 54 may comprise a motor 56 and a gear box 58 operably connected to a drive member 60 (which may be a gear, pulley, or the like), which may be attached to the drive 20 as shown in FIG. 1. The gear box 58 may comprise a plurality of gears (not shown) as necessary and known in the art in order to connect the motor 56 with the drive member 60 and coordinate the speed of the motor 56 with the desired speed of the drive member 60. The actuator drive assembly 54 may further comprise an idler member 62 (which may also be a gear, pulley, or the like) and a closed-loop belt 64 (which may be a toothed belt) operably engaged with the members 60, 62. The actuator device 50 may be fixedly attached to the belt 64 and is translatable in a lateral direction 66 by the actuator drive assembly 54. Specifically, the actuator drive assembly 54 rotates the drive member 60, which causes the belt 64 to translate therearound and the idler member 62 to rotate around a longitudinally-oriented shaft 74. When the actuator device 50 is engaged with the extending member 24 of a cartridge engaging device 22 as shown in FIG. 3, the cartridge engaging device 22 may be translated in a lateral direction 66 by the actuator device 50, thus pushing a cartridge 18 out of a storage location 16 (FIG. 2) or pulling a cartridge 18 into a storage location 16 (FIG. 2), as described in further detail below. The actuator device 50 may also be slidably mounted on a shaft 68 which is preferably laterally-oriented and positioned directly adjacent to (but not in contact with) the belt 64 as shown in FIG. 3. The shaft 68 provides stability to the actuator device 50 during translation thereof. The shaft 68 is preferably attached to a translatable portion of the cartridge handling assembly 10 such as the read/write drive 20.

Figure 4:
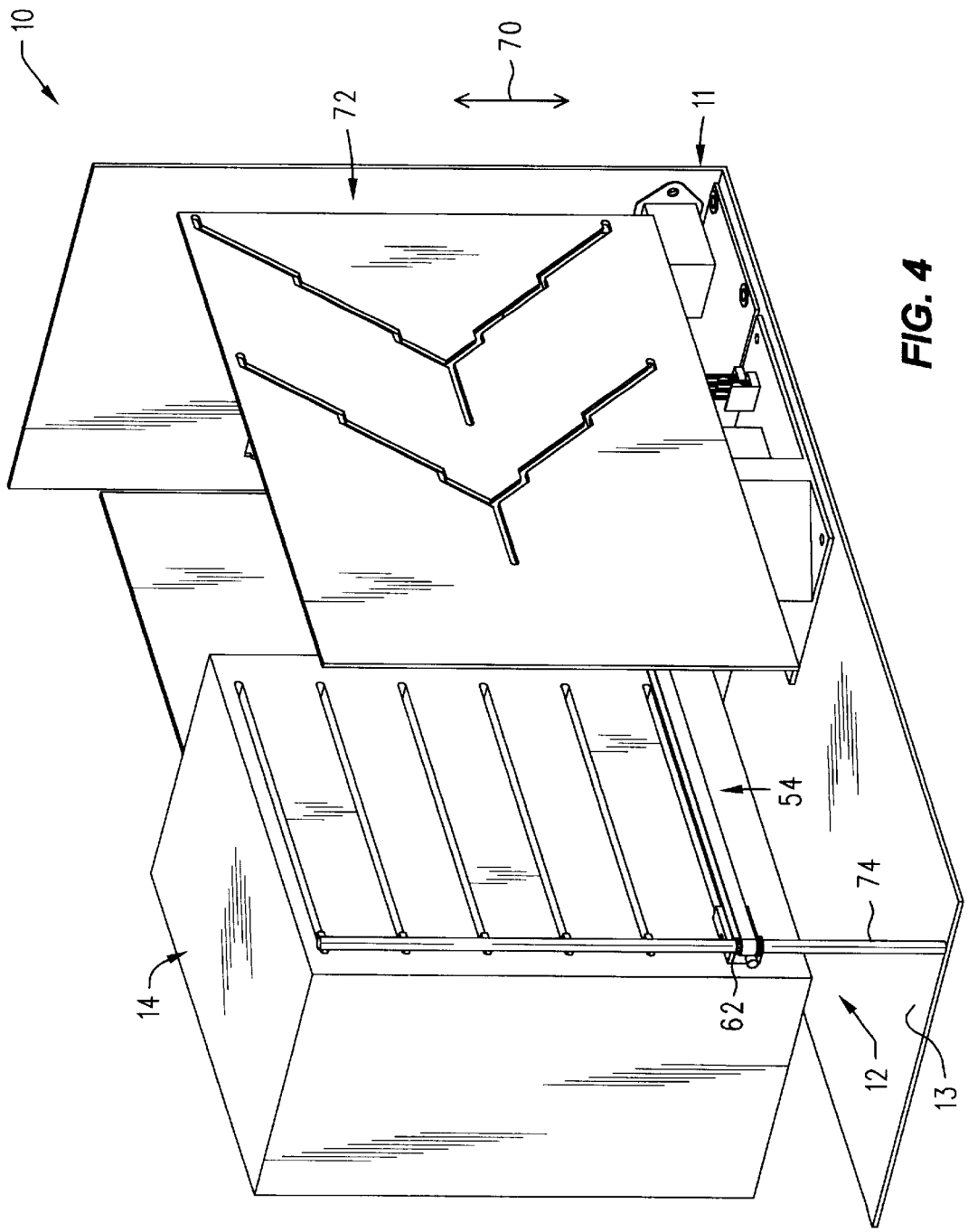
FIG. 4 is an isometric view of the cartridge handling system of FIG. 1 utilizing a linear translation assembly.

The read/write drive 20, actuator device 50, and actuator drive assembly 54 are translatable among the storage locations 16 (FIG. 2) in a longitudinal direction 70 (FIGS. 2 and 4). As shown in FIG. 4, a linear translation assembly 72 may be provided which is adapted to linearly translate the read/write drive 20, actuator device 50, and actuator drive assembly 54 among the storage locations 16. The linear translation assembly 72 may of the type illustrated in FIG. 4, which is substantially identical to the vertical lift system shown and described in U.S. patent application Ser. No. 09/031,753 for PIN-IN-TRACK LIFT SYSTEM (hereinafter '753), which was incorporated by reference above. However, while the lift system described in '753 is adapted to translate a cartridge engaging assembly (media access device), the linear translation assembly 72 of the present invention is adapted to translate the read/write drive 20, actuator device 50, and actuator drive assembly 54 in direction 70 as shown in FIG. 4. To accommodate the lift system, pins 21, 23 may project directly from the read/write drive 20 as shown in FIG. 1. Alternatively, a carriage member (not shown) may be provided which has pins projecting therefrom and which is adapted to carry the read/write drive 20.

It is to be understood that the present invention is not limited to use with only the linear translation assembly 72 shown in FIG. 4. Alternatively, the linear translation assembly utilized with the present invention may be of the type described in U.S. Pat. No. 5,5106,556 for LINEAR DISPLACEMENT AND SUPPORT APPARATUS FOR USE IN A CARTRIDGE HANDLING SYSTEM, which was incorporated by reference above and which is also a vertically-oriented linear translation assembly.

It should be noted, however, that the cartridge engaging assembly of the present invention is neither dependent on gravity nor is its operation hindered by gravity. Consequently, the cartridge engaging assembly of the present invention is easily adaptable for use with either horizontally-oriented cartridge storage arrays (not shown) or vertically-oriented cartridge storage arrays (e.g., 14). Thus, the read/write drive 20, actuator device 50, and actuator drive assembly 54 may utilize a vertically-oriented linear translation assembly as described above, or may also be adapted to utilize a horizontally-oriented linear translation assembly such as those described in U.S. Patent Application Serial for MODULAR DATA STORAGE SYSTEM or U.S. patent application Ser. No. 09/337,802 for APPARATUS FOR TRANSLATING A CARTRIDGE ACCESS DEVICE, which were incorporated by reference above. Utilized in the present invention, the linear translation assembly described in each of these references must necessarily be adapted to translate the read/write drive 20, actuator device 50, and actuator drive assembly 54, rather than a cartridge engaging assembly.

Regardless of the type of linear translation assembly 72 utilized with the present invention, the cartridge handling system 10 may further comprise a longitudinally-oriented shaft 74 (FIGS. 2 and 4) on which the idler member 62 may be slidably and rotatably mounted as discussed above. In addition to allowing rotation therearound, the shaft 74 allows the idler member 62 to be translated along with the remainder of the actuator drive assembly 54 in a longitudinal direction 70. The shaft 74 extends at least the length of the cartridge storage array 14, and preferably to the top (not shown) and bottom 13 of the housing 11 (FIG. 4) so that the shaft 74 may be fixedly attached to and supported by a non-translating portion of the cartridge handling assembly 10 (the housing 11). The cartridge storage array 14 is also preferably fixedly attached to a non-translating portion of the cartridge handling assembly 10 such as the housing 11 (FIG. 4).

Figure 5:
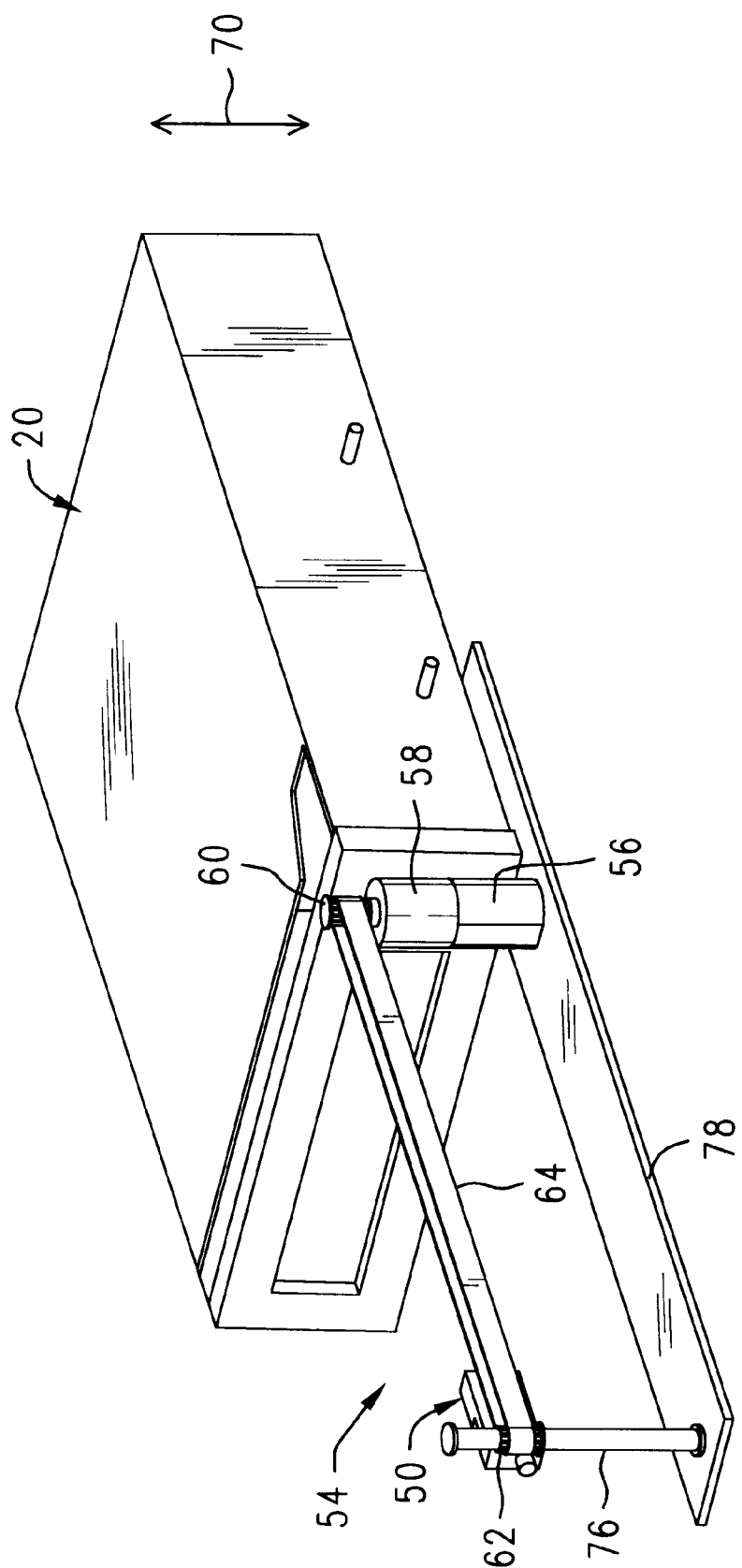
FIG. 5 is an isometric view of another embodiment of the cartridge engaging assembly of FIG. 1 with a read/write drive.

An alternative embodiment of the shaft 74 is shown in FIG. 5. In this embodiment, a longitudinally-oriented shaft 76 which is much shorter than shaft 74 is provided which is translatable in direction 70 along with the actuator drive assembly 74, etc. The shaft 76 may be fixedly attached to a plate 78 which is fixedly attached to a translatable portion of the cartridge handling system 10 such as the read/write drive 20. As shown in FIG. 5, the plate 78 may also be used to support the entire actuator drive assembly 54, including the motor 56, gear box 58, drive member 60, idler member 62, and belt 64, as well as the actuator device 50 attached to the belt 64. Thus, the motor 56 and gear box 58 need not be attached directly to the read/write drive 20.

Figure 6:
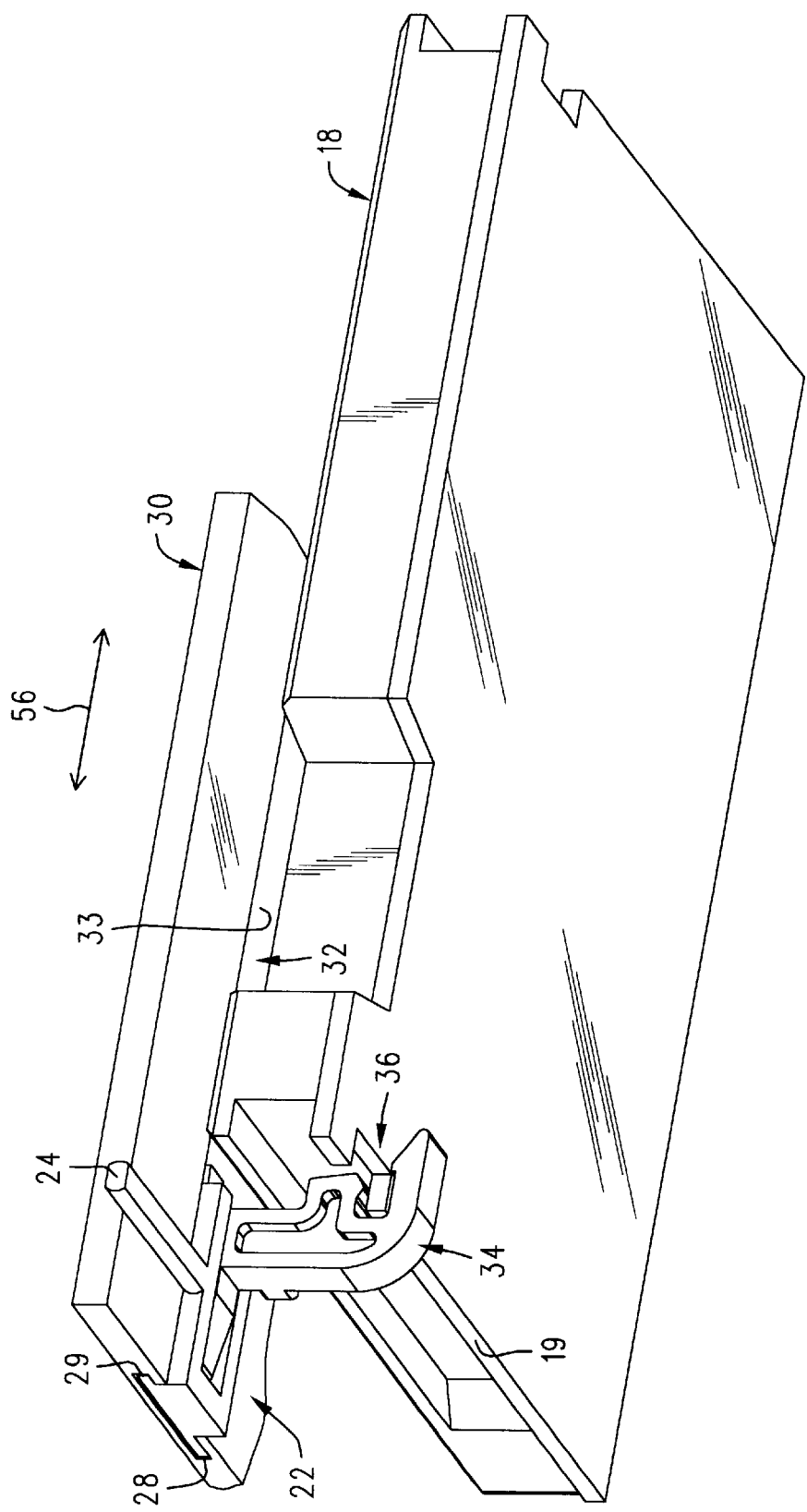
FIG. 6 is an isometric view of a cartridge and cartridge engaging device of the assembly of FIG. 1.
Figure 7:
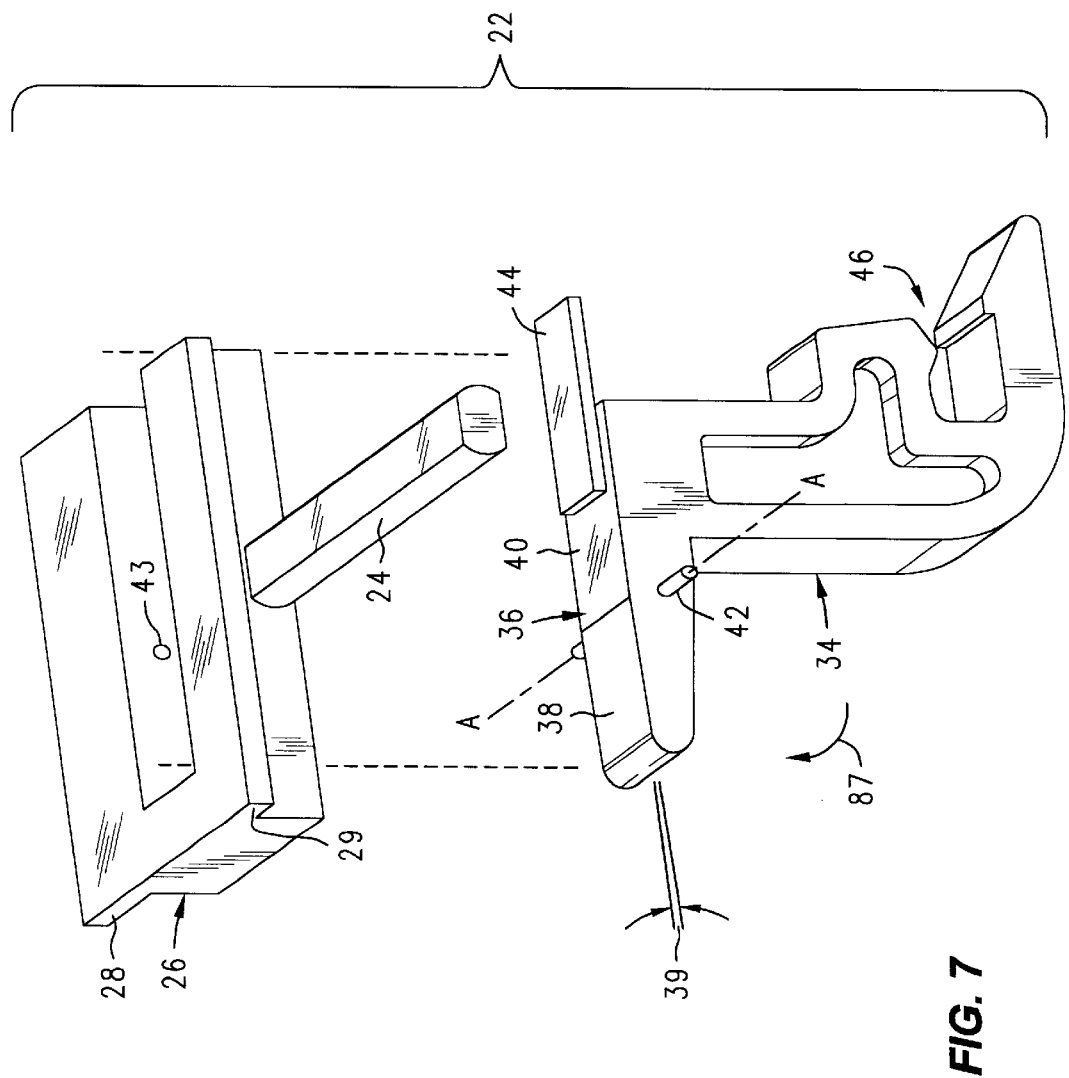
FIG. 7 is an exploded isometric view of the cartridge engaging device of FIG. 6.

The cartridge engaging device 22 is shown in FIGS. 6 and 7. As noted above, the cartridge engaging device 22 may comprise an extending member 24 which is engageable by the actuator device 50 (FIGS. 1–5). As best shown in FIG. 7, the extending member 24 may project from and be integrally formed with an upper member 26. The cartridge engaging device 22 may be slidably attached to a guide plate 30 (FIGS. 3 and 6). As shown in FIGS. 3, 6 and 7, the upper member 26 may be substantially T-shaped and comprise flanges 28, 29 which are adapted to be received within a T-shaped slot 32 in the guide plate 30. A guide plate 30 is preferably fixedly attached or integrally formed within each of the cartridge storage locations 16 (FIG. 2).

As shown in FIGS. 6 and 7, the cartridge engaging device 22 may further comprise a latch member 34 which is adapted to grasp a cartridge 18. It is to be understood that the cartridge engaging device 22 of the present invention is not limited to the latch member 34 shown in FIGS. 6–10. Instead, the cartridge engaging device may be comprised of any device which is adapted to grasp a cartridge, such as a latch which is adapted to engage a notch in the cartridge, or a latch (or roller) which uses friction to engage a cartridge.

As best shown in FIG. 7, the latch member 34 may be rotatably attached to the upper member 26 with a dowel pin 42 or the like which may extend into holes 43 (only one shown) in the upper member 26 and which defines a rotational axis AA. As shown in FIGS. 3, 6 and 7, the latch member 34 may comprise an upper portion 36 having a first upper surface 38 and a second upper surface 40. These surfaces 38, 40 are adapted to contact the generally flat upper surface 33 of the T-shaped slot 32 in the guide plate 30 in order to limit rotation of the latch member 34 around axis AA. The second upper surface 40 is preferably oriented generally horizontally. The first upper surface 38 is preferably oriented at a small angle 39, e.g., approximately 1.5° to 2°, relative to the second upper surface 40 (i.e., at a small angle to the horizontal). The cartridge engaging device 22 may further comprise a biasing member 44 such as a leaf spring which urges the latch member 34 in an "open" position (shown in FIGS. 8 and 9). Specifically, the biasing member 44 urges the latch member 34 in a rotational direction 87 which causes the first upper surface 38 to abut against the T-shaped slot upper surface 33. As shown in FIGS. 6–10, the latch member 34 may further comprise a substantially C-shaped portion 46 which is adapted to engage an edge portion 19 of a cartridge 18 when the latch member is in a "closed" position as described in further detail below with reference to FIG. 10.

Figure 8:
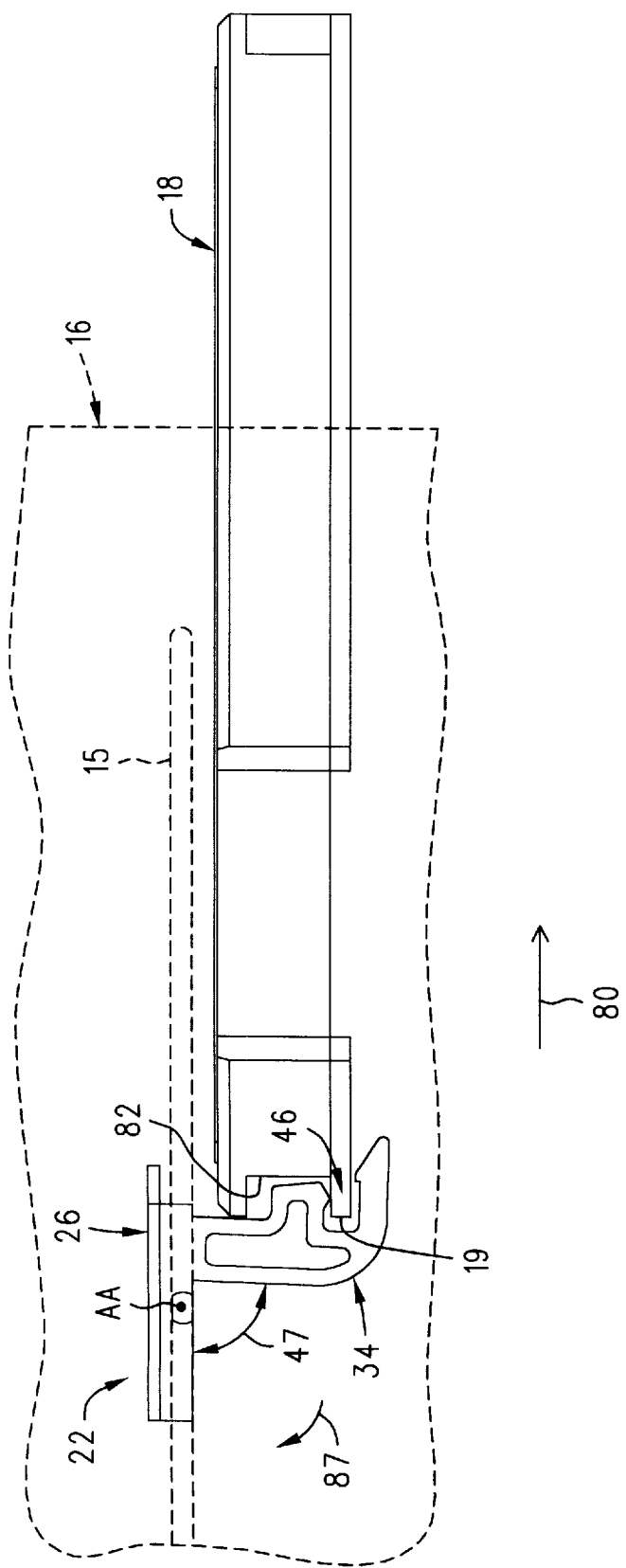
FIG. 8 is a side view of the cartridge and cartridge engaging device of FIG. 6 in a push operating mode.
Figure 9:
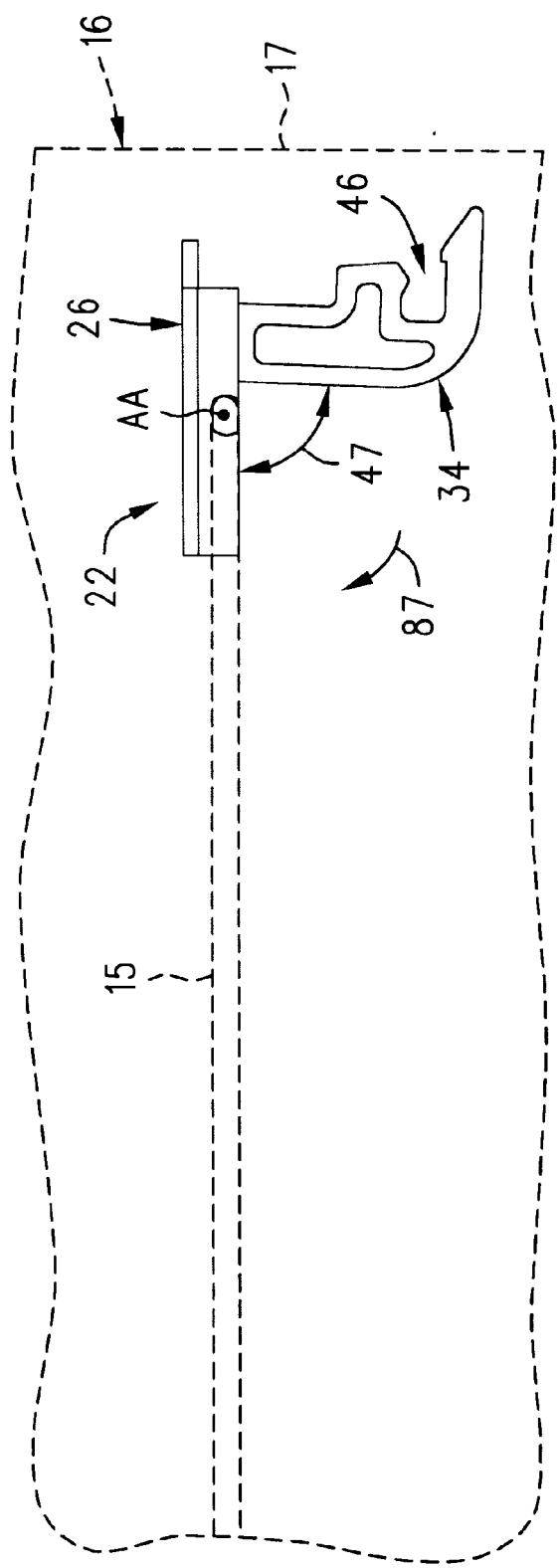
FIG. 9 is a side view of the cartridge engaging device of FIG. 6 in a ready operating mode.
Figure 10:
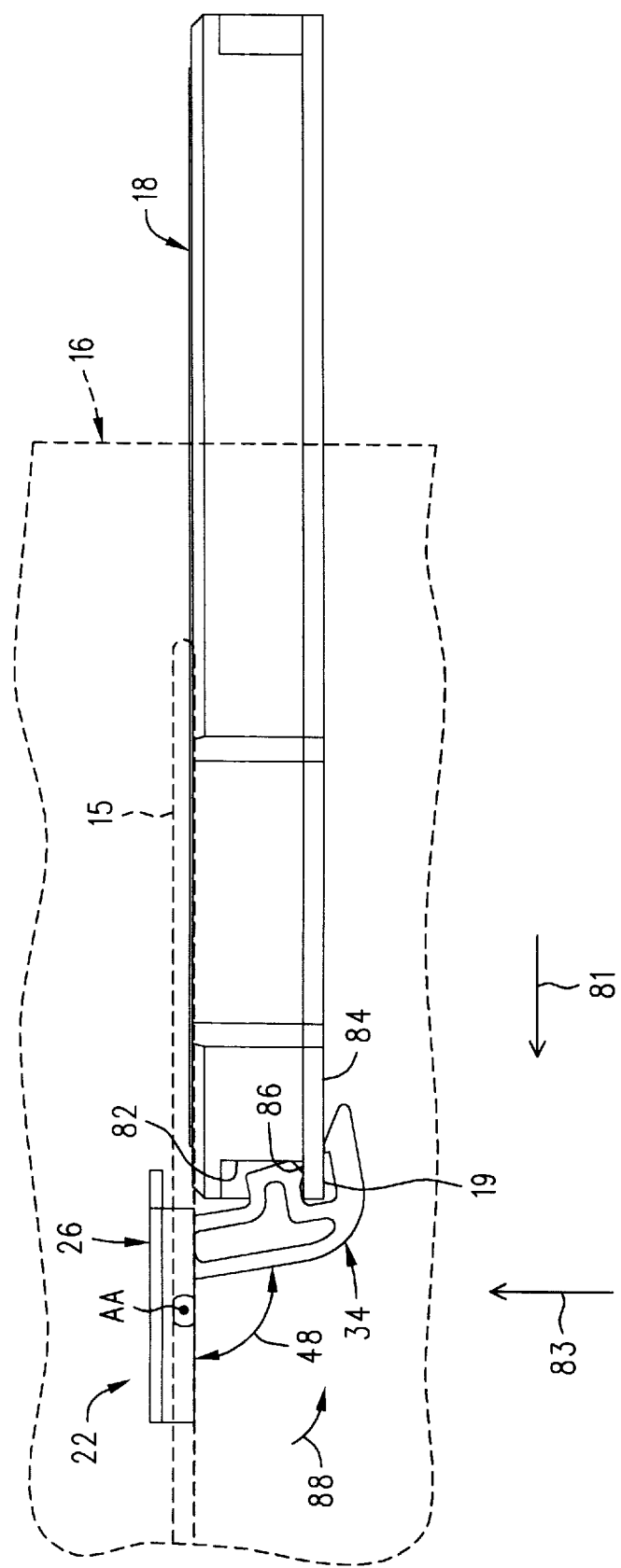
FIG. 10 is a side view of the cartridge and cartridge engaging device of FIG. 6 in a pull operating mode.

FIGS. 8–10 illustrate the operating modes of each cartridge engaging device 22. FIG. 8 illustrates the push operating mode of the cartridge engaging device 22 whereby a cartridge is pushed out of a cartridge storage location 16 (shown in phantom). During the push operating mode, the latch member 34 is in an open position as described above and engages (or at least surrounds) an edge portion 19 of the cartridge 18. As the cartridge engaging device 22 is translated in a lateral direction 80, force provided by the latch member 34 on the rear sidewall 82 of the cartridge 18 pushes the cartridge 18 out of the storage location 16. During the push operating mode, the latch member 34 is in an open position. As described above relative to FIGS. 6 and 7, the first upper surface 38 of the latch member 34 abuts and lies nearly horizontally against the T-shaped slot upper surface 33 (allowing for a slight clearance between the latch member 34 and the slot 32 in the guide plate 30, FIG. 6), which prevents any further rotation of the latch member 34 in direction 87. When the latch member 34 is in the open position as shown in FIGS. 8 and 9, the angle 47 between the latch member 34 and the upper member 26 is slightly less than 90°. When the cartridge 18 reaches the read/write drive 20 (FIG. 1), the drive grabs the cartridge 18 and pulls it away from the latch member 34, and the cartridge engaging assembly enters into the ready operating mode.

FIG. 9 illustrates the ready operating mode of the cartridge engaging device 22 whereby the latch member 34 remains in an open position at the forward end 17 of a cartridge storage location 16 (shown in phantom), awaiting receipt of a cartridge. When a cartridge is returned to a cartridge storage location 16, the read/write drive 20 (FIG. 1) ejects the cartridge 18 into a waiting latch member 34, and the cartridge engaging device 22 enters into the pull operating mode.

FIG. 10 illustrates the pull operating mode of the cartridge engaging device 22 whereby a cartridge 18 is pulled into a cartridge storage location 16 (shown in phantom). When a cartridge 18 is ejected by a read/write drive 20 (FIG. 1) into a waiting latch member 34, the force of the cartridge 18 urges the latch member 34 into a closed position, causing the C-shaped portion 46 to engage and bind with an edge portion 19 of the cartridge 18. Specifically, during the pull operating mode, the latch member 34 rotates into a closed position along axis AA in direction 88 such that the angle 48 between the latch member 34 and the upper member 26 is greater than 90°. The C-shaped portion 46 of the latch member 34 contacts the bottom wall 84, lower inner wall 86, and possibly the rear sidewall 82 of the cartridge 18. As the cartridge engaging device 22 is translated in a lateral direction 81, force provided by the latch member 34 on the bottom wall 84 and lower inner wall 86 binds the latch member 34 with the cartridge 18 and causes the latch member 34 to lift the edge portion 19 of the cartridge slightly in direction 83. This binding/lifting action prevents any further rotation of the latch member 34 in direction 88 and allows the cartridge 18 to be pulled into the storage location 16. In addition, the second upper surface 40 of the latch member 34 may abut against the T-shaped slot upper surface 33 (FIG. 6). When this operating mode is complete and the cartridge 18 is positioned in a storage location 16 (FIG. 2), the biasing member 44 (FIG. 7) urges the latch member 34 into an open position as shown in FIG. 8 to unbind the cartridge 18 from the latch member 34 in preparation for the push operating mode.

In accordance with the above, the present invention discloses a method for transporting a cartridge between a storage location 16 and a read/write drive 20 utilizing the cartridge engaging assembly 12 described herein. With reference to FIGS. 1–10, the method comprises a first step of longitudinally aligning the read/write drive 20 with a cartridge storage location 16 and the actuator device 50 with a cartridge engaging device 22. To accomplish this, the linear translation assembly 72 may be utilized in order to translate the read/write drive 20, actuator drive assembly 54, and actuator device 50 in a longitudinal direction 70 until the drive 20 is aligned with a desired cartridge storage location 16. Next, the cartridge engaging device 22 is engaged by the actuator device 50. Finally, the actuator device 50 is translated in a lateral direction 80, 81, thereby pushing a cartridge 18 out of a storage location 16 or pulling a cartridge 18 into a storage location 16.

Figure 11:
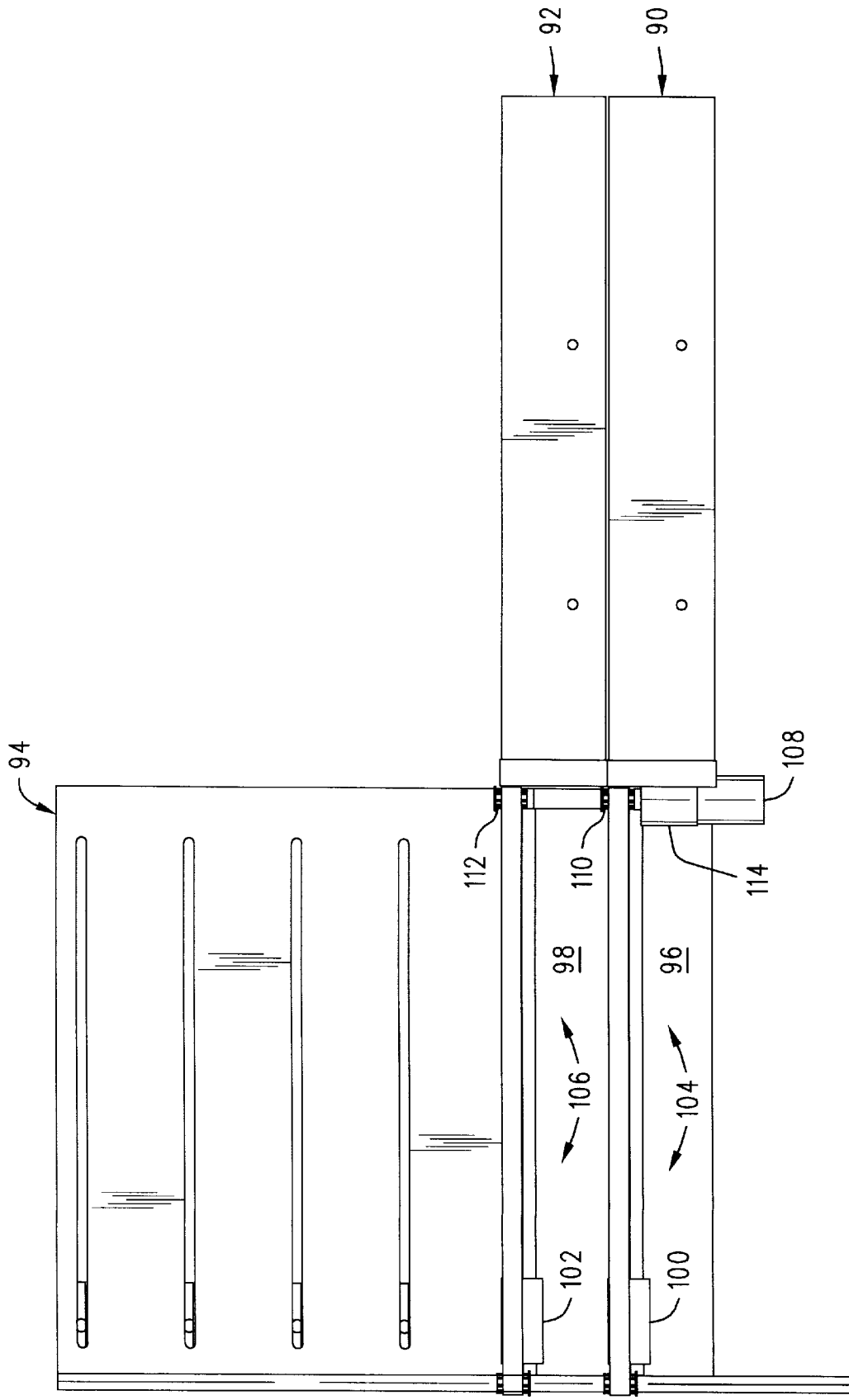
FIG. 11 is a side view of another embodiment of the cartridge handling system whereby more than one read/write drive is utilized.

FIG. 11 illustrates an alternative embodiment of the present invention whereby two or more read/write drives 90, 92 are provided in order to increase the speed and efficiency of the cartridge handling system. While two read/write drives 90, 92 are shown, it is to be understood that any desired number of read/write drives 90, 92 may be provided. In addition, in all of the embodiments described herein, the present invention may utilize any number of storage arrays 94 having any number of cartridge storage locations (16, FIG. 2).

In the embodiment shown in FIG. 11, each of the read/write drives 90, 92 may be aligned with a cartridge storage location 96, 98, respectively. An actuator device 100, 102 and actuator drive assembly 104, 106 may be provided for each drive 90, 92, respectively. In order to reduce the total parts count and cost, the actuator drive assemblies 104, 106 may utilize a single motor 108 which may be connected to separate drive members 110, 112 (which may be gears, pulleys, or the like) via one or more gear boxes 114 (only one shown). Alternatively, separate motors (not shown) may be utilized.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

I claim:

1. A cartridge engaging assembly for a cartridge handling system comprising at least one cartridge storage array having a plurality of storage locations and at least one read/write drive positioned directly adjacent to said cartridge storage array, said cartridge engaging assembly comprising:

a) a cartridge engaging device positioned within each of said storage locations which is adapted to be linearly translated in a lateral direction in order to push a cartridge out of one of said storage locations during a push operating mode or pull a cartridge into one of said storage locations during a pull operating mode;

b) at least one actuator device which is adapted to engage said cartridge engaging device in order to push a cartridge out of one of said storage locations or pull a cartridge into one of said storage locations;

c) at least one actuator drive assembly operably connected to said actuator device which is adapted to linearly translate said actuator device in a lateral direction; and d) a linear translation assembly adapted to linearly translate said read/write drive, said actuator device, and said actuator drive assembly among said storage locations in said cartridge storage array in a longitudinal direction.

2. The cartridge engaging assembly of claim 1, said actuator drive assembly comprising:

a) a motor;

b) a drive member operably connected to said motor;

c) an idler member rotatably mounted on a longitudinally-oriented shaft; and d) a belt operably connected to said drive member and said idler member, said actuator device being attached to said belt and linearly translatable thereon in said lateral direction.

3. The cartridge engaging assembly of claim 2 wherein said actuator device is slidably mounted on a laterally-oriented shaft.

4. The cartridge engaging assembly of claim 1, wherein:

a) each of said storage locations comprises a slot;

b) said cartridge engaging device comprises an extending member which extends through said slot; and c) said actuator device comprises a notch which is engageable with said extending member during said push operating mode and said pull operating mode.

5. The cartridge engaging assembly of claim 1, wherein:

a) said cartridge engaging device comprises a latch member which is engageable with a cartridge, said latch member comprising:
   i) an open position whereby said latch member is unbound from a cartridge; and
   ii) a closed position whereby said latch member is bound with a cartridge;

b) said cartridge engaging device further comprises a ready operating mode whereby said latch member is ready to receive a cartridge;

c) said latch member is in said open position during said push operating mode and said ready operating mode; and d) said latch member is in said closed position during said pull operating mode.

6. The cartridge engaging assembly of claim 5 further comprising a guide plate positioned within each of said storage locations, said guide plate comprising a slot having a slot upper surface, and wherein:

a) said cartridge engaging device is slidably received within said slot;

b) said latch member is rotatable around an axis and comprises a first upper surface and a second upper surface, said first upper surface being oriented at an angle to said second upper surface;

c) said latch member rotates around said axis in a first rotational direction and said latch member first upper surface abuts said slot upper surface during said push operating mode; and e) said latch member rotates around said axis in a second rotational direction opposite said first rotation direction and binds with a cartridge during said pull operating mode.

7. The cartridge engaging assembly of claim 5 wherein said latch member comprises a C-shaped portion which is engageable with an edge portion of a cartridge.

8. A cartridge handling system, comprising:

a) at least one cartridge storage array having a plurality of storage locations;

b) at least one linearly translatable read/write drive positioned directly adjacent to said cartridge storage array;

c) a cartridge engaging assembly comprising:
   i) a cartridge engaging device positioned within each of said storage locations which is adapted to be linearly translated in a lateral direction in order to push a cartridge out of one of said storage locations during a push operating mode and pull a cartridge into one of said storage locations during a pull operating mode;
   ii) at least one actuator device which is adapted to engage said cartridge engaging device in order to push a cartridge out of one of said storage locations or pull a cartridge into one of said storage locations; and
   iii) at least one actuator drive assembly operably connected to said actuator device which is adapted to linearly translate said actuator device in a lateral direction; and d) a linear translation assembly adapted to linearly translate said read/write drive, said actuator device, and said actuator drive assembly among said storage locations in said cartridge storage array in a longitudinal direction.

9. The cartridge handling system of claim 8, said actuator drive assembly comprising:

a) a motor;

b) a drive member which is operably connected to said motor;

c) an idler member rotatably mounted on a longitudinally-oriented shaft; and d) a belt operably connected to said drive member and said idler member, said actuator device being attached to said belt and linearly translatable thereon in said lateral direction.

10. The cartridge handling system of claim 9 wherein said actuator device is slidably mounted on a laterally-oriented shaft.

11. The cartridge handling system of claim 8, wherein:

a) each of said storage locations comprises a slot;

b) said cartridge engaging device comprises an extending member which extends through said slot; and c) said actuator device comprises a notch which is engageable with said extending member during said push operating mode and said pull operating mode.

12. The cartridge handling system of claim 8, wherein:

a) said cartridge engaging device comprises a latch member which is engageable with a cartridge, said latch member comprising:
   i) an open position whereby said latch member is unbound from a cartridge; and
   ii) a closed position whereby said latch member is bound with a cartridge;

b) said cartridge engaging device further comprises a ready operating mode whereby said latch member is ready to receive a cartridge;

c) said latch member is in said open position during said push operating mode and said ready operating mode; and d) said latch member is in said closed position during said pull operating mode.

13. The cartridge engaging assembly of claim 12 further comprising a guide plate positioned within each of said storage locations, said guide plate comprising a slot having a slot upper surface, and wherein:

a) said cartridge engaging device is slidably received within said slot;

b) said latch member is rotatable around an axis and comprises a first upper surface and a second upper surface, said first upper surface being oriented at an angle to said second upper surface;

c) said latch member rotates around said axis in a first rotational direction and said latch member first upper surface abuts said slot upper surface during said push operating mode; and e) said latch member rotates around said axis in a second rotational direction opposite said first rotation direction and binds with a cartridge during said pull operating mode.

14. The cartridge handling system of claim 12 wherein said latch member comprises a C-shaped portion which is engageable with an edge portion of a cartridge.

15. A method for transporting a cartridge between a storage location and a read/write drive in a cartridge handling system utilizing a cartridge engaging assembly, said cartridge engaging assembly comprising a cartridge engaging device positioned within each of said storage locations which is adapted to be linearly translated in a lateral direction in order to push a cartridge out of one of said storage locations or pull a cartridge into one of said storage locations, and an actuator device which is adapted to engage said cartridge engaging device in order to push a cartridge out of one of said storage locations or pull a cartridge into one of said storage locations, said method comprising:

a) longitudinally aligning said read/write drive with one of said storage locations and said actuator device with said cartridge engaging device;

b) engaging said cartridge engaging device with said actuator device; and c) linearly translating said actuator device in said lateral direction.

16. A cartridge engaging assembly for a cartridge handling system comprising at least one cartridge storage array having a plurality of storage locations and at least one read/write drive positioned directly adjacent to said cartridge storage array, said cartridge engaging assembly comprising:

a) cartridge engaging means within each of said storage locations for engaging and pushing a cartridge out of one of said storage locations and pulling a cartridge into one of said storage locations;

b) actuator means for engaging said cartridge engaging device in order to push a cartridge out of one of said storage locations or pull a cartridge into one of said storage locations;

c) drive assembly means for linearly translating said actuator means in a lateral direction; and d) translation assembly means for linearly translating said read/write drive, said actuator means, and said drive assembly means among said storage locations in said cartridge storage array in a longitudinal direction.

* * * * *